June 2, 1936.  W. DALTON  2,043,034
TRAILER FOR HIGHWAY AND RAILWAY TRAVEL
Filed Dec. 8, 1933  2 Sheets-Sheet 1
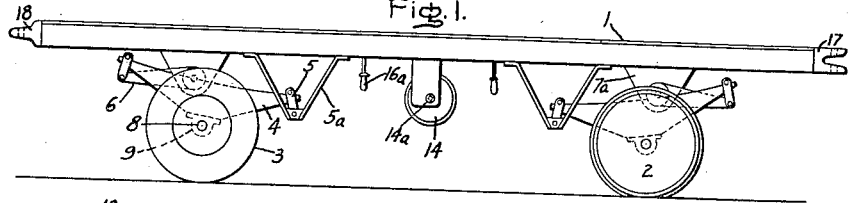
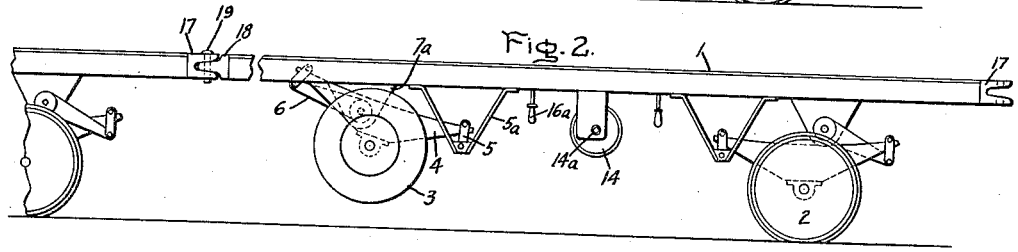
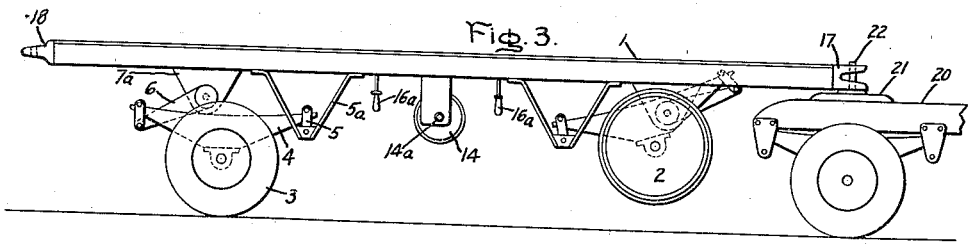
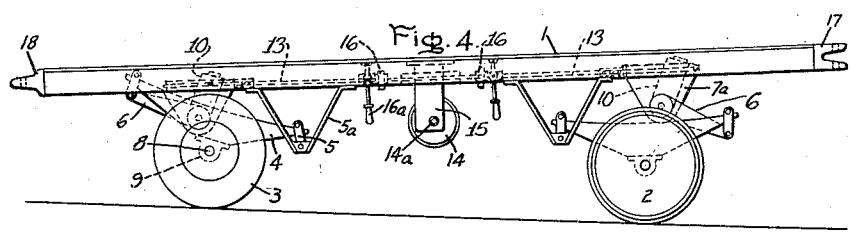
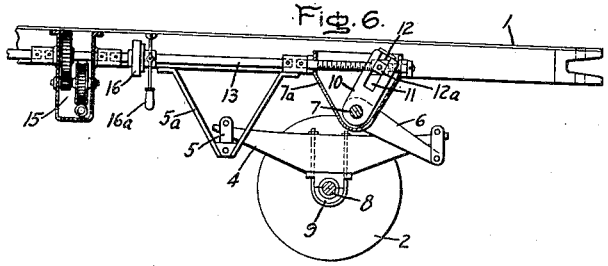
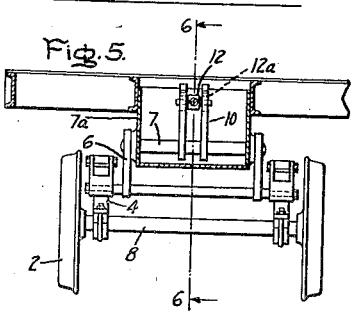
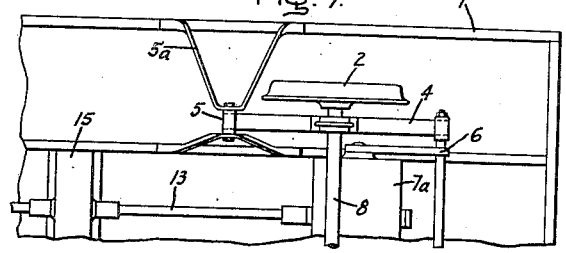
Inventor:
William Dalton.
by Harry E. Dunham
His Attorney June 2, 1936.  W. DALTON  2,043,034
TRAILER FOR HIGHWAY AND RAILWAY TRAVEL
Filed Dec. 8, 1933  2 Sheets-Sheet 2
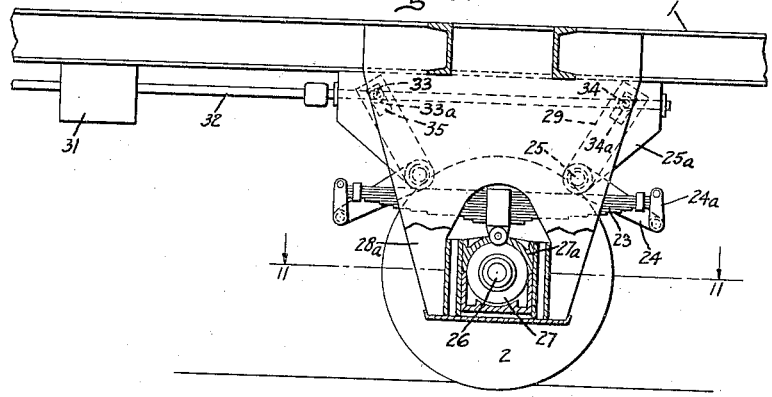
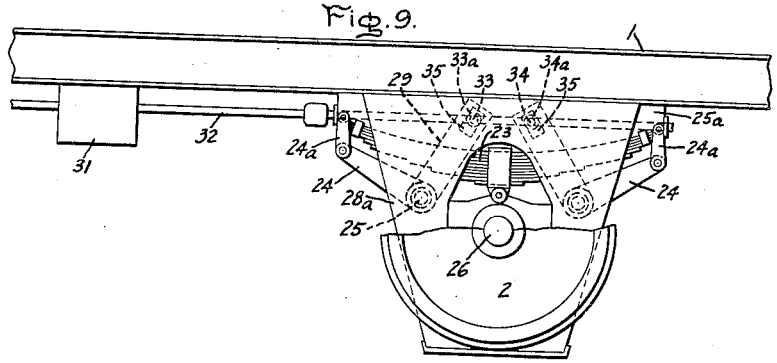
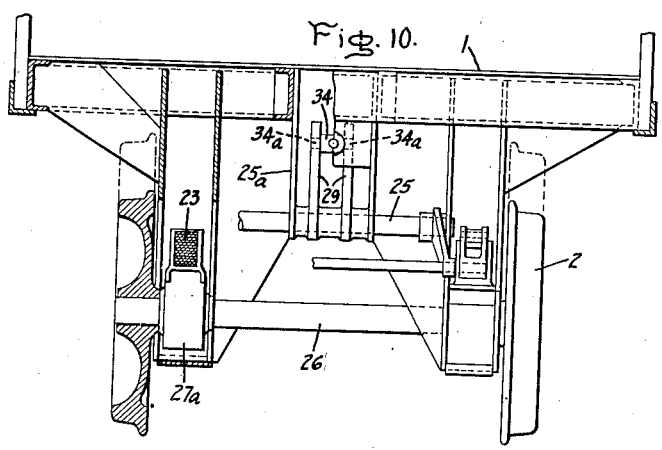
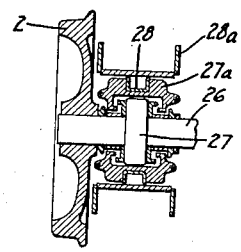
Inventor:
William Dalton,
by Harry E. Dunham
His Attorney.

Patented June 2, 1936

2,043,034

UNITED STATES PATENT OFFICE 2,043,034

TRAILER FOR HIGHWAY AND RAILWAY TRAVEL

William Dalton, Schenectady, N. Y., assignor to General Electric Company, a corporation of New York Application December 8, 1933, Serial No. 701,448

11 Claims. (Cl. 105—215)

My invention relates to trailers adapted to alternative use on railways or highways, and more particularly to that type of trailer in which one end of the trailer is supported by the vehicle to which the trailer is connected.

The trailers which have been heretofore designed for alternative highway or railway use have been of the four-wheel type in which a set of highway wheels and a set of railway wheels are arranged at each end of the trailer. In this construction, it is necessary to provide a steering arrangement for the highway wheels and to provide for pivotal mounting of the frame on the railway wheels. The steering arrangement and the pivotal mounting greatly complicate the construction and undesirably increases the weight of the trailer.

In the trailer constructed in accordance with my invention which is of the two-wheel type, the steering arrangement for the highway wheels and the pivotal mounting of the vehicle frame on the railway wheels are not necessary, and consequently a light-weight and practical construction is obtained.

An object of my invention is to provide a trailer in which one end of the trailer is alternatively supported by the railway or the highway wheels, and the other end of the trailer is supported by the vehicle to which the trailer is connected.

Further objects and advantages of my invention will become apparent as the following description proceeds, and the features of novelty which characterize my invention will be pointed out with particularity in the claims annexed to and forming a part of this specification.

For a better understanding of my invention, reference may be had to the accompanying drawings in which Fig. 1 is a side elevation of a trailer embodying my invention in a position in which the trailer is supported by both the highway and the railway wheels; Fig. 2 is a side elevation of the trailer connected to another vehicle and arranged for operation on a railway; Fig. 3 is a side elevation of the trailer connected to a truck and arranged for operation on a highway; Fig. 4 is a side elevation of the trailer with the wheels in the position shown in Fig. 2 and the coupling disconnected, showing how one end of the frame of the trailer may be elevated by adjusting the relative positions of the wheels when it is desired to couple the trailer to another vehicle; Fig. 5 is an end elevation of the trailer partly broken away; Fig. 6 is a sectional view on line 6—6 of Fig. 5; Fig. 7 is a bottom plan view of the end of the trailer supported on railway wheels; Figs. 8 and 9 are side elevations of a modification of my invention showing the railway wheels in the lowered and raised portions respectively; Fig. 10 is an end elevation partly in section of the trailer shown in Figs. 8 and 9; and Fig. 11 is a sectional view on line 11—11 of Fig. 8.

In the embodiment of my invention illustrated in Figs. 1 to 7 inclusive, the frame 1 of the trailer, which may be of any suitable construction, is shown connected at one end to a set of flanged wheels 2 supporting one end of the trailer when it is used on a railway, and connected at the opposite end to a set of rubber-tired wheels 3 for supporting the other end of the trailer when it is used on a highway. Each set of wheels is connected to the frame by a vertically adjustable mounting which comprises a pair of elliptical springs 4 pivotally connected to the frame at one end by means of spring shackles 5 and a bracket 5a, and at the other end by levers 6 fixed to shaft 7 which is journaled in a housing 7a secured to the frame 1. Levers 6 are adjustably secured in the desired position by levers 10 fixed at one end to shaft 7 and cooperating at the other end with a nut 12 threaded on the shaft 13 and pivotally connected to blocks 12a slidably arranged in slots 11 in the levers 10. The position of levers 6, and consequently the position of the sets of wheels 2 and 3, which are fixed to axles 8 carried in bearings 9 attached to the springs 4, is adjusted by moving the levers 10 about the axis of shafts 7 by rotating shaft 13. I prefer to rotate the shaft 13 by an electric motor 14 connected to the shafts 13 through a gear train 15 or a hand crank fitted on the motor shaft at 14a, but any suitable source of power may be used for turning the shafts 13. The adjusting mechanism is arranged so that the turning of motor 14 in a clockwise direction causes the highway wheels to be raised or retracted toward the frame and the railway wheels to be lowered. Couplings 16 placed in shafts 13 on either side of the gear train 15 are arranged to be engaged and disengaged by levers 16a to control the operation of the adjusting mechanism acting on either set of wheels and make possible the separate or simultaneous adjustment of either set of wheels. When either set of wheels has been moved to its retracted or raised position, the other set of wheels is preferably in its lowered position so that the frame may be supported at a uniform height above the road surface.

When the trailer is arranged for railway service, as shown in Fig. 2, one end of the frame 1 is supported by a coupling comprising interfitting parts 17 and 18 which are fastened together by pin 19. When the trailer is connected to a truck 20 for highway service as shown in Fig. 3, the end of the trailer adjacent the truck is supported by a center-plate 21 on the truck and secured by a pin 22 passing through the part 17 of the coupling. For convenience in coupling a number of trailers together, a coupling is provided at each end of the frame.

Figs. 8, 9, 10 and 11 show a modification of the mechanism for adjustably mounting the wheels beneath the trailer. Only the end of the trailer supported by the railway wheels 2 is illustrated, but the same construction may also be used to support the trailer on the highway wheels. The railway wheels 2 are connected to the trailer by a mounting which comprises two elliptical springs 23 connected to the frame at each end through shackles 24a and levers 24 fixed to shafts 25 which are journaled in a housing 25a attached to the frame 1. The levers 24 are retained in the desired position by levers 29 fixed on shafts 25. The railway wheels 2 are fixed on an axle 26 which is carried in bearings 27 in bearing housings 27a attached to springs 23. Suitable guides 28 in pedestals 28a cooperate with bearing housings 27a to guide the vertical movement of wheels 2 and to transmit the longitudinal thrust from the wheels 2 to the frame 1. The position of the springs 23, and consequently the position of the railway wheels 2, is adjusted by rotating levers 29 about the axis of shaft 25. The power for adjusting the levers 29 is obtained from a motor 31 and transmitted through a shaft 32 to oppositely threaded nuts 33 and 34 which are connected to rolls 33a and 34a slidably fitted in slots 35 in the levers 29. When the shaft 32 is rotated, the nuts 33 and 34 move in opposite directions along the shaft 32 and turn the levers 29 about the axes of shafts 25. The vertical movement of the springs is such that the ends of the springs are substantially parallel for all positions of the springs.

For the purpose of describing the operation of my trailer, first assume that the trailer is in the position indicated in Fig. 1, in which the frame or body of the trailer is supported by both the railway and highway wheels. In this position the trailer can be moved about the platform, but is not suited for use on either a railway or a highway. To place the trailer in condition for use on a highway, motor 14 is turned in a clockwise direction, lowering the flanged or railway wheels 2, and raising or retracting the highway wheels 3. The position of the trailer is now shown by Fig. 4, the end of the frame opposite the highway wheels being raised sufficiently to allow center-plate 21 of the truck 20 to be placed beneath the coupling 17. The motor 14 is then rotated in a counter-clockwise direction, raising the flanged wheels 2 and lowering the highway wheels 3. During this movement, the coupling 17 is lowered in place on the center-plate 21, and the highway wheels take up the support of the end of the trailer opposite the truck, the coupling between the trailer and truck being completed by pin 22. The trailer is now in the position shown in Fig. 3 and is arranged for highway service. By following the procedure outlined above, the adjusting mechanism for the wheels is used to lift the frame of the trailer. In other lifting mechanism is available, the adjusting mechanism need not be used to elevate the frame of the trailer.

The change from the position shown in Fig. 3, in which the trailer is arranged for highway service, to the position shown in Fig. 2, in which the trailer is arranged for railway service, may be effected without substantially changing the level of the trailer frame. The trailer is backed by the truck so that the coupling 18 on the end of the trailer opposite the truck engages with coupling 17 on the end of another trailer or a locomotive arranged for railway service. The coupling is completed by pin 19. Motor 14 is then rotated in a clockwise direction retracting highway wheels 3 and lowering railway wheels 2 to the positions shown in Fig. 2. The coupling to the truck may now be disconnected by withdrawing pin 22, and the trailer may be used for railway service. During the transition from the position of Fig. 3 to the position of Fig. 2, the trailer is supported at either end by the connected vehicle so that no separate mechanism is necessary to support the frame of the trailer during the transition. When arranged for either railway or highway service, one end of the trailer is alternatively supported by the railway or highway wheels.

Although I have shown a particular embodiment of my invention, I do not desire to be limited to the construction described, and I intend in the appended claims to cover all modifications which do not depart from the spirit and scope of my invention.

What I claim as new and desire to secure by Letters Patent of the United States, is:

1. A trailer comprising a frame, means including railway and highway wheels each displaced longitudinally from the middle of said frame for alternatively supporting said frame, coupling means for connecting said frame to a vehicle, said coupling means being at the end of said frame remote from the wheels supporting said frame, said coupling means supporting said frame on said vehicle.

2. A trailer comprising a frame, highway wheels and railway wheels each displaced longitudinally from the middle of said frame, means for alternatively supporting said frame on said highway wheels or said railway wheels, said means providing for adjusting the relative vertical position of said highway and railway wheels with respect to said frame, and coupling means for connecting said frame to a vehicle, said coupling means being at the end of said frame remote from the wheels supporting said frame, said coupling means supporting said frame on said vehicle.

3. A trailer comprising a frame, a set of highway wheels and a set of railway wheels each displaced longitudinally from the middle of said frame, means for alternatively supporting said frame on said highway wheels or said railway wheels, said means providing for simultaneous raising of one set of said wheels and lowering of the other set of said wheels, and coupling means for connecting said frame to a vehicle, said coupling means being at the end of said frame remote from the wheels supporting said frame, said coupling means supporting said frame on said vehicle.

4. A trailer comprising a frame, a set of highway wheels and a set of railway wheels connected to opposite ends of said frame, means for alternatively supporting one end of said frame on one set of said wheels, and means including a coupling at the other end of said frame for connecting said other end of said frame to a vehicle and for supporting said other end of said frame on said vehicle.

5. A trailer comprising a frame, a set of highway wheels and a set of railway wheels connected to opposite ends of said frame, means for alternatively supporting one end of said frame on one set of said wheels, said means including means for adjusting the relative vertical position of said wheels with respect to said frame, and means including a coupling at the other end of said frame for connecting the other end of said frame to a vehicle and for supporting the other end of said frame on said vehicle.

6. A trailer comprising a frame, longitudinal members pivotally connected to opposite ends of said frame, a set of railway wheels carried by certain of said longitudinal members, a set of highway wheels carried by others of said longitudinal members, means including said longitudinal members for alternatively supporting one end of said frame on one of said sets of wheels, and means including a coupling at the other end of said frame for connecting the other end of said frame to a vehicle and for supporting the other end of said frame on said vehicle.

7. A trailer comprising a frame, elliptical springs connected to opposite ends of said frame, a set of railway wheels carried by certain of said springs, a set of highway wheels carried by others of said springs, means including levers connected to said springs for alternatively supporting one end of said frame on one of said sets of wheels, and means including a coupling at the other end of said frame for connecting the other end of said frame to a vehicle and for supporting the other end of said frame on said vehicle.

8. A trailer comprising a frame, elliptical springs connected to opposite ends of said frame, a set of railway wheels carried by certain of said springs, a set of highway wheels carried by others of said springs, pedestals attached to said frame for guiding the vertical movement of said sets of wheels, means including an arrangement for adjusting the vertical position of one of said sets of wheels with respect to said frame for alternatively supporting one end of said frame on one of said sets of wheels, and means including a coupling at the other end of said frame for connecting the other end of said frame to a vehicle and for supporting the other end of said frame on said vehicle.

9. A trailer comprising a frame, elliptical springs pivotally connected to opposite ends of said frame, levers connecting the other end of each of said springs to said frame, railway wheels carried by certain of said springs, highway wheels carried by others of said springs, means for alternatively supporting one end of said frame on said highway or said railway wheels, said means including an arrangement for rotatably adjusting said levers, and means including a coupling at the other end of said frame for connecting the other end of said frame to a vehicle and for supporting the other end of said frame on said vehicle.

10. A trailer comprising a frame, elliptical springs arranged at opposite ends of said frame, levers connecting one end of each of said springs to said frame, railway wheels carried by certain of said springs, highway wheels carried by others of said springs, pedestals attached to said frame for guiding the vertical movement of said wheels, means for alternatively supporting one end of said frame on said highway or said railway wheels, said means including an arrangement for rotating said levers connected to said springs, and means including a coupling at the other end of said frame for connecting the other end of said frame to a vehicle and for supporting the other end of said frame on said vehicle.

11. A rail highway vehicle having flanged rail wheels secured beneath the same at one end and road wheels secured beneath the same at the other end, with means for supporting either end of a similar vehicle in elevated position and means for pivotally connecting said vehicles adjacent the point of support, whereby a plurality of said vehicles may be connected as an articulated road or rail train with each vehicle supported on the wheels at one end only and pivotally connected to the vehicle in front of it.

WILLIAM DALTON.